US011944993B1

(12) United States Patent
Burgener et al.

(10) Patent No.: US 11,944,993 B1
(45) Date of Patent: Apr. 2, 2024

(54) SEMI CONCENTRIC ENHANCED PARALLEL PATH PNEUMATIC NEBULIZER

(71) Applicants: John A. Burgener, Mississauga (CA); Mirah J. Burgener, North Saanich (CA)

(72) Inventors: John A. Burgener, Mississauga (CA); Mirah J. Burgener, North Saanich (CA)

(*) Notice: Subject to any disclaimer, the term of this patent is extended or adjusted under 35 U.S.C. 154(b) by 0 days.

(21) Appl. No.: 18/058,001

(22) Filed: Nov. 22, 2022

(51) Int. Cl.
*B05B 7/08* (2006.01)

(52) U.S. Cl.
CPC .......... *B05B 7/0861* (2013.01); *B05B 7/0815* (2013.01)

(58) Field of Classification Search
CPC ............................ B05B 7/0815; B05B 7/0861
USPC .............................................................. 239/8
See application file for complete search history.

(56) References Cited

U.S. PATENT DOCUMENTS 3,980,233 A 9/1976 Simmons et al.
5,411,208 A 5/1995 Burgener
6,166,379 A 12/2000 Montaser et al.
6,634,572 B1 10/2003 Burgener
7,472,705 B2 * 1/2009 Baran ................ A61M 16/042 604/528
7,600,511 B2 * 10/2009 Power .................. A61M 16/08 128/200.14
7,607,436 B2 * 10/2009 Smaldone ............. A61M 16/04 128/200.23
7,712,466 B2 * 5/2010 Addington ............... A61B 5/08 128/200.19
7,748,377 B2 * 7/2010 Smith .................... B65D 1/095 128/200.14
8,051,854 B2 * 11/2011 Faram .............. A61M 16/0051 128/200.14
8,322,334 B2 * 12/2012 Lee ....................... A61M 16/14 239/338
9,032,951 B2 * 5/2015 Finlay ............... A61M 16/0463 128/200.14

FOREIGN PATENT DOCUMENTS

CA 2112093 C 2/1995
CA 2384201 A1 9/2002

* cited by examiner

*Primary Examiner* — Chee-Chong Lee
(74) *Attorney, Agent, or Firm* — Lathrop GPM LLP; Ricardo Ochoa

(57) ABSTRACT

A semi concentric enhanced parallel path pneumatic nebulizer is described which has a nebulizer body with an inner capillary and outer passage, with liquid flow in one and gas flow in the other. The passage extends around the inner capillary and contacts the inner capillary's outer walls at the tip of the nebulizer body in a nozzle end. The inner capillary has a single lumen which conveys a fluid from an inlet on one end of the nebulizer to an exit port in the nozzle end. The inner capillary seals the passage within the nozzle end and has an opening in the capillary wall extending from the outermost edge of the capillary to the passage in the nebulizer body, allowing the fluid in the passage to exit the nebulizer through an exit port in the capillary wall. The fluids, being a gas and a liquid, interact to form an aerosol.

13 Claims, 5 Drawing Sheets

PRIOR ART

SEMI CONCENTRIC ENHANCED PARALLEL PATH PNEUMATIC NEBULIZER

BACKGROUND

Various embodiments relate generally to nebulizer systems, methods, and devices and, more specifically, relate to parallel path pneumatic nebulizers.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

Pneumatic nebulizers are devices designed to use a gas flow to interact with a liquid and break the liquid into an aerosol, typically referred to as atomizing. Many designs of pneumatic nebulizers exist, with paint spray, medical inhalers, and analytical nebulizers being the most common. The vast majority of nebulizers are based on the gas flow inducing the liquid into the gas flow and breaking the liquid into small particles in the process, forming an aerosol. For analytical usages, nebulizers are used to make the aerosol of small particles as repeatedly and consistently as possible. Other applications are preferentially consistent but not as critically as with analytical nebulizers. A nebulizer design that meets the criteria of analytical nebulizers, will also work well for other applications.

Many analytical nebulizers use concentric designs, with two passages, one passing through the other, ideally centered and slightly smaller in outer diameter than the other's internal dimension at the exit point in the nebulizer. The resultant aerosol produced is improved if the inner capillary is precisely concentric. Gas is applied to one passage and the gas passing out of the passage creates a lower pressure drawing a liquid out of the other passage. While most are designed to have the inner passage carry the liquid and the outer passage carry the gas, they can be made with the gas flow in the center and the liquid in the outer passage.

One of the oldest patents of concentric nebulizers is Canadian Patent No. 2405 (Robinson) entitled "Petroleum Tar Burner", dated Apr. 18, 1873, for oil burner concentric nebulizers. The components were made of cast iron and steel pipes, but the concept remains unchanged in modern analytical nebulizers, such as glass analytical nebulizers sold at present. Typically, a concentric nebulizer will have the inner passage as a capillary tube that is attached at the back of the nebulizer where the gas and liquid enter the device and is centered in the larger outer passage's exit port. For most nebulizers, this uses a center capillary of stiff material so that it can maintain its position relative to the outer passage. It is difficult to maintain a flexible inner capillary centered in the exit port of the outer passage. Typically, concentric nebulizers have a central capillary with a very small outside diameter to allow the gas flow to pass closely to the liquid flow and create a good aerosol. For common analytical glass concentric nebulizers, the inner capillary may be only a few hundred microns in diameter.

Many pneumatic nebulizers provide suction on the liquid which causes the liquid to be drawn into the gas flow and form an aerosol. This is also true for most nonconcentric pneumatic nebulizers, but some use a pump, rather than suction, to deliver the liquid to the zone of interaction between the gas and liquid at the exit port of the nebulizer. For instance, U.S. Pat. No. 6,634,572 (Burgener) and the corresponding Canadian Patent No. 2,384,201 (Burgener)

both entitled "Enhanced Parallel Path Nebulizer with a Large Range of Flow Rates", the disclosures of which are incorporated by reference in their entirety, describe enhanced parallel path nebulizers which use the liquid's surface tension to draw the liquid into the gas flow and allow the gas to impact the liquid and push it into the gas flow. This system does not use suction from the gas flow on the liquid.

Other nebulizers, such as, cross flow nebulizers, V-groove nebulizers, and concentrics operate with the liquid being sucked into the gas flow due to the lower pressure at the gas exit port or gas orifice. In a cross-flow nebulizer, the gas flow is at right angles to the liquid exit port. Gas flow of sufficient amounts creates suction on a nearby liquid surface regardless of the detailed configuration. In conventional glass concentric nebulizers (such as shown in FIG. 4 and FIG. 5), the gas flowing out of the exit port of at the tip of the nebulizer creates a lower pressure on the liquid at the tip of the exit port of the liquid capillary and sucks the liquid into the gas flow. These concentric nebulizers operate best when the outer second fluid exit port is nearly perfectly centered around the inner capillary tubing.

Enhanced parallel path nebulizers are used extensively as analytical nebulizers for sample introduction for Inductively Coupled Plasma Spectrometers (ICP). This nebulizing process and device independently brings the gas and liquid flow together with a gas orifice that is shaped to draw the liquid into the gas stream. A cross section of this nebulizer is illustrated in FIG. 1 and FIG. 2. The enhanced parallel path system is of note in that the general method of manufacture has two passages beside each other throughout the nebulizer body, but the interaction zone is only at the exit point of the gas passage. The name 'Parallel Path' relates to the nebulizer typically having the gas and liquid passages run beside each other in the body of the nebulizer, rather than one encircling the other as in a concentric nebulizer, or one at right angles to the other as in a cross-flow nebulizer. The parallel arrangement can be difficult to produce and usually is done with extruded materials, with two or more passages in the material beside each other—which is a multi-lumen tube. Lumen is defined in this industry and context as a bore hole extending the whole length of the tubing. Multi-lumen tubing refers to more than one bore hole extending the whole length of the tubing. Single lumen tubing refers to only one bore hole extending the whole length of the tubing.

Multi-lumen tubing requires more sophisticated equipment to make and is usually much more expensive than single lumen tubing. Single lumen tubing is available from many manufacturers, and is generally stocked in specific sizes commonly used. Multi-lumen is available from few manufacturers and is generally made when ordered and rarely stocked as each order is likely of a different arrangement of the lumens. Many systems use multi-lumen tubing, such as some nebulizers. To be able to use single lumen tubing instead of multi lumen tubing would dramatically lower the cost to produce such nebulizers, and allow the nebulizers to be made of stock materials instead of specially made materials.

The difficulty of using multi-lumen tubing can be noted in U.S. Pat. No. 9,032,951 B2 (Finlay et al.) entitled "Aerosol Delivery Device", dated May 19, 2015, for medical aerosol delivery through a catheter. The multi-lumen tubing is narrow and flexible, allowing it to carry a liquid and a gas in a catheter. However, the central lumen carries the liquid, and the other lumens need to be blocked where the multi-lumen capillary connects with the liquid source, to keep the liquid out. Blocking a narrow multi-lumen tube requires a notch on the outside of the tubing that only exposes the outer lumens and does not harm the inner tubing. This is usually done by hand under a microscope. The outside lumens need to be blocked with glue or a melted plastic or some similar means. This too is typically done by hand under a microscope. For Teflon multi-lumen tubing, glue is a poor way to plug the outer lumens since nothing sticks to Teflon and the glue is likely to push out. Melted plastic is also not a good plug since PTFE Teflon does not melt and other plastics do not stick. PFA Teflon can be melted, but PFA is soft and easily stretched and not a preferable tubing to use if stretching is a potential problem. With the outer lumens notched and plugged at the liquid input, the multi-lumen tubing requires another set of notches in the outer walls to allow the gas to enter the outer lumens. Again, typically done by hand under a microscope and necessary to open the outer lumen (s) without damaging the inner lumen.

It would be a significant advantage to not require multi-lumen tubing. Multi-lumen tubing is expensive, only available from a limited number of manufacturers, and available in a limited number of materials.

In the enhanced parallel path system, the liquid is not required to travel beside the gas, but needs to provide a smooth flow of liquid to the gas/liquid interface to provide a good interaction, forming an aerosol. The gas passage and liquid passage are not required to be parallel, and are not required to extend through the body of the nebulizer beside each other. To operate, the system only needs to ensure that the gas is properly interacting with the liquid at the interface between the gas orifice and liquid exit point. The gas and liquid may travel on significantly different paths without an adverse effect.

This allows the configurations of the gas and liquid passages to be more convenient to manufacture with similarities to concentric nebulizers, but with the usage of very large inner capillaries that are much easier to make, with a wider range of materials suitable for the inner capillaries and with standard single lumen tubing instead of multi-lumen tubing.

SUMMARY

The below summary is merely representative and non-limiting.

This design is a pneumatic nebulizer that is significantly easier to manufacture than previous designs, using materials that are typically stock items with many sources, as opposed to special order items. A significant advantage is that this design allows for multiple passages to convey fluids (liquids and/or gases) without requiring multi-lumen tubing. A second advantage is that this design allows for a wide range of materials to be used as neither flexibility nor rigidness are required for the components of the nebulizer's inner capillaries. Materials such as metals or ceramics can be used as well as soft flexible plastics.

This design is of a nebulizer with a body that has fluid inlets for liquid(s) and/or gas(ses), a passage and capillary (ies) to convey the fluids, and an area with exit ports for the fluids. The area where the passage and inner capillary(ies) come together and where the exit ports are located is the nozzle end. The exit ports are the outermost edge of the capillary(ies) and opening(s) where the fluids exit the lumen and opening(s) and interact to form an aerosol. Typically, one inlet port will be used for the liquid and one for the gas, but multiple inlets may be used, and multiple gases and liquids may be used. The first fluid, generally the liquid, is conducted from the first fluid inlet to the first fluid exit port in the nozzle end through an inner capillary. The nebulizer has a passage inside the body that conducts the second fluid from the second fluid inlet to the second fluid exit port in the nozzle end. The passage has a larger internal diameter (ID) than the outer diameter (OD) of the inner capillary so that it allows the inner capillary to pass through the passage and allows the second fluid to flow around the inner capillary from its inlet to the nozzle end.

The nozzle end has an ID that is smaller than the ID of the passage, and is sealed with the inner capillary such that the second fluid in the passage would be blocked from passing through the nozzle end. The inner capillary has at least one opening in its wall extending from the passage to a second fluid exit port in the nozzle end so that the second fluid in the passage can pass through the nozzle end to exit the nebulizer at the second fluid exit port. The inner capillary extends into the nozzle end with the first fluid exit port near to the second fluid exit port. This allows the exiting fluids to interact and form an aerosol. Various configurations of the exit ports may be used for the interaction between the fluids, in order to form an aerosol.

BRIEF DESCRIPTION OF THE DRAWINGS

Aspects of the described embodiments are more evident in the following description, when read in conjunction with the attached Figures.

DETAILED DESCRIPTION

Figure 1:
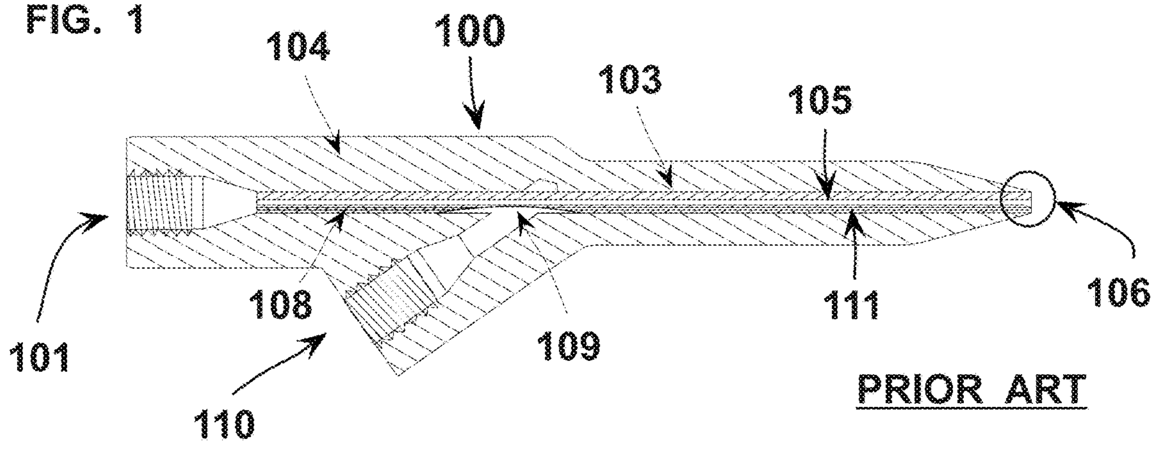
FIG. 1 is a side view cross section of a prior art enhanced parallel path nebulizer.

Various embodiments provide an enhanced parallel path nebulizer with a liquid passage surrounded by a gas passage for the majority of the body, as is typical of a concentric nebulizer, with the nozzle end being different than is typical of a concentric nebulizer. As such, this design does not have a gas passage and a liquid passage parallel to each other for the majority of the nebulizer configuration.

In this embodiment, the first fluid is a liquid, and the second fluid is a gas. The gas and liquid interact at the exit ports in the nozzle end, and may include an area beyond the nebulizer body where the gas and liquid continue to interact after leaving the nebulizer body.

Various embodiments provide a simple to manufacture process that allows for a wide variation in gas/liquid interaction methods and allows for a wide range of materials to be used in the construction of the device.

In some non-limiting embodiments, the first fluid is generally a liquid which flows through an inner capillary. The second fluid is generally a gas, which flows in the passage around the inner capillary. Minor variations allow the first fluid to be a gas, and the second fluid to be a liquid.

One embodiment provides a nebulizer body with a gas inlet and liquid inlet at one end and exit ports at the other end. The body has an interior space that acts as a passage which conveys a fluid from an inlet to the nozzle end with the fluid surrounding the inner capillary, and an inner capillary which conveys another fluid from the other inlet to the nozzle end. The area where the passage and inner capillary(ies) come together and where the exit ports are located is the nozzle end. The inner capillary is secured to the nebulizer body at the fluid inlet, so that the fluid traveling through the inner capillary does not interact or mix with the fluid traveling through the passage until the exit ports. Both of the inlets have convenient ways of attaching lines carrying gas or liquid to the nebulizer body by means of a compression fitting, a threaded fitting, or other commonly available fittings and adaptors.

The inner capillary seals the passage preventing any flow out of the nebulizer body from the passage.

At least one opening in the inner capillary wall allows the second fluid, being a gas or liquid, to flow through the nozzle end and exit in a specific, limited zone, being the second fluid exit port. The second fluid is limited to exit the passage thorough the at least one opening in the inner capillary's wall. The opening does not extend around the inner capillary as it must in concentric nebulizers. The size, shape and quantity of the opening(s) determine the nature of interaction between the gas flow and the liquid. This may allow the same interaction as seen in an enhanced parallel path or parallel path nebulizer, or it may allow suction as in a concentric nebulizer.

Suction will occur if the gas flow from the gas exit port is sufficiently high enough to cause a lower pressure near the liquid's exit port. In some cases, the suction on the liquid can be enhanced if the inner capillary does not extend fully through the nozzle end to the tip of the nebulizer, but stops recessed from the tip, so that the nozzle end continues after the gas and liquid exit ports. Such a recess may create turbulence and re-mixing of aerosols formed, so that there are optimal distances depending on the desired gas flow and liquid flow rates.

Figure 2:
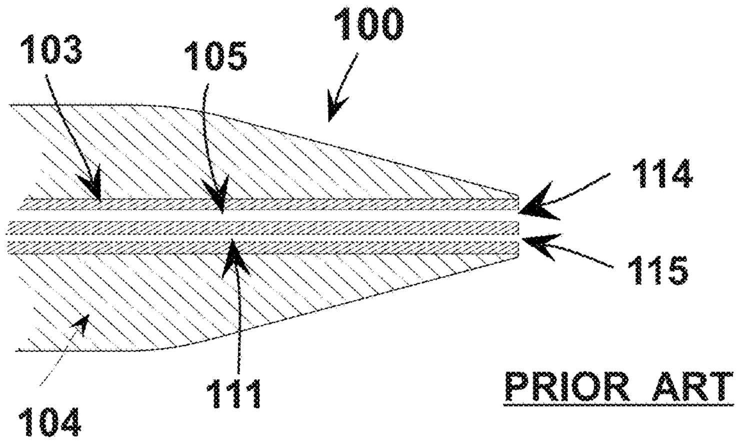
PRIOR ART FIG. 2
FIG. 2 is a close up view of the side view of the prior art enhanced parallel path nebulizer.

FIG. 1 and FIG. 2 show a side view cross section of an enhanced parallel path nebulizer 100 that is presently commercially available for analytical usage. FIG. 2 is a close up of the nebulizer's tip. For the enhanced parallel path nebulizer 100, there is a first fluid inlet 101; a second fluid inlet 110; a nebulizer body 104 with a hole that is filled with a multi-lumen capillary 103, and a tip 106 where the exit ports 114 and 115 are located. The two lumens 105 and 111 within the multi-lumen capillary 103 carry the liquid and gas to the fluid exit ports 114 and 115 at the nebulizer tip 106. The second fluid lumen 111 (generally used for the gas) has a plug 108 in the back portion of the multi-lumen capillary 103 to prevent liquid entering the capillary from the first fluid inlet 101, and a notch 109 on the side of the multi-lumen+capillary 103 allowing the second fluid (generally a gas) to enter the second fluid lumen 111. The first fluid lumen 105 (generally used for the liquid) is continuous from the first fluid inlet 101 to the first fluid exit port 114 at the tip 106 of the nebulizer.

The exit ports 114 and 115 are at the nebulizer tip 106. The exit ports are configured in an enhanced parallel path interface between the gas and liquid passages, and the liquid is atomized by interacting with the gas exiting through the gas exit port 115.

The nebulizer 100 has a multilumen capillary 103 press fit into the nebulizer body 104. This requires very exact inner dimensions of the nebulizer body 104 as well as very exact outer dimensions of the multi lumen capillary 103 so that the multi-lumen capillary is able to fit into the space precisely and is able to seal along the length of the nebulizer's central hole. Minor scratches on the inner wall of the body's central hole will allow gases or liquids to leak from the input areas 101 and 110 into the exits 114 and 115 or back to the other liquid or gas inlets 101 and 110. Any gas leaking from the second fluid inlet 110 into the first fluid inlet 101 can cause bubbles in the liquid flow which creates short periods of zero liquid flow, ruining the analytical results which depend on a constant and consistent flow of the liquids.

The multi-lumen tubing 103 is press-fit into the nebulizer body's central hole, and uses the ability of the material to stretch slightly along its length, which shrinks the OD of the multi-lumen tubing enough so that it can be inserted into the nebulizer's central hole, and then rebound to its original size to seal the interior of the nebulizer body 104. It is very difficult to fit a non-stretchable material into a non-flexible body material.

At present, the commercially available enhanced parallel path nebulizers are made of PTFE (Polytetrafluoroethylene) either as the central multi-lumen capillary tubing or as the body material or both. PTFE has the ability to stretch slightly and return to its original size if it is not over stretched. Softer materials such as polypropylene or PFA (Perfluoroalkoxy) have been tried for the multi-lumen capillary, but found to stretch too much and do not seal inside the nebulizer body. Harder materials such as Copper, Stainless Steel and PEEK (Polyether ether ketone) have been tried for the nebulizer body, but require a softer flexible material such as PTFE for the multi-lumen tubing to fit tightly and seal in the central hole of the nebulizer body. The material choices for a conventional enhanced parallel path nebulizer are very limited.

Figure 3:
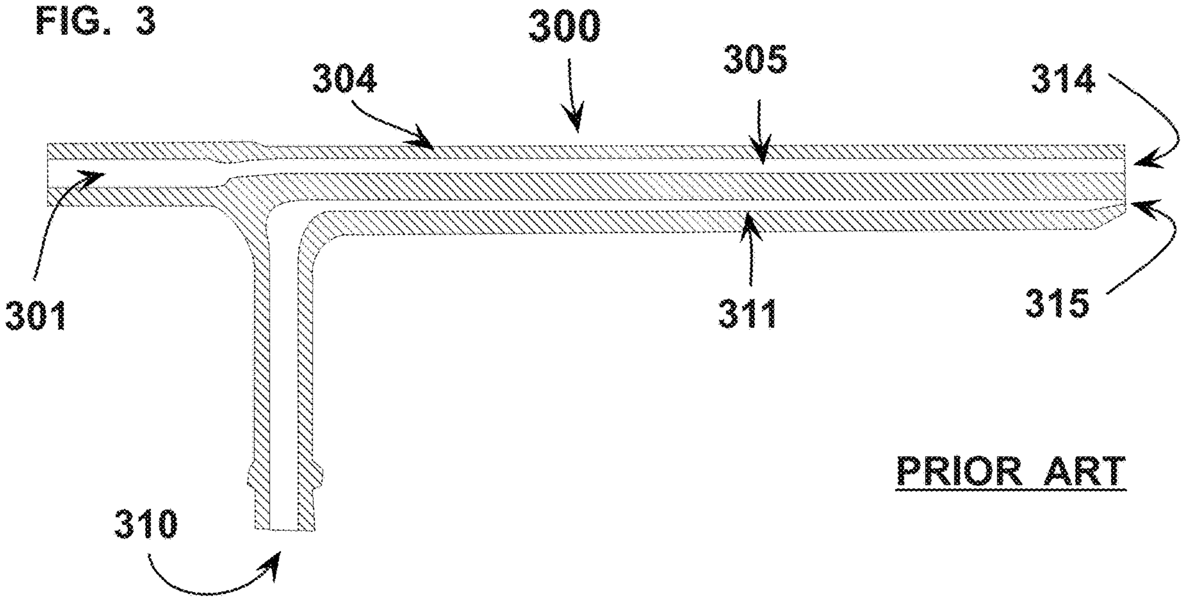
PRIOR ART FIG. 3
FIG. 3 is a side view cross section of a prior art glass nebulizer using two parallel passages in the glass to convey the gas and liquid to the tip.

FIG. 3 shows a side view cross section of a glass nebulizer 300 with two parallel passages 305 and 311 in the glass nebulizer 300 to convey a liquid and a gas to the tip. This is a good representation of several nebulizers in production at present such as described in U.S. Pat. No. 11,378,518 (Leikin et al.) July 2022. Various nebulizers differ mainly at the tip in how the gas and liquid interact to produce an aerosol. There is a liquid inlet 301; a gas inlet 310; a nebulizer body 304; a liquid passage 305; a gas passage 311; a liquid exit port 314; and a gas exit port 315. This nebulizer 300 is produced from a rod of glass or quartz with two existing passages 305 and 311. Exit ports 314 and 315 are modified to produce a working nebulizer.

Figure 4:
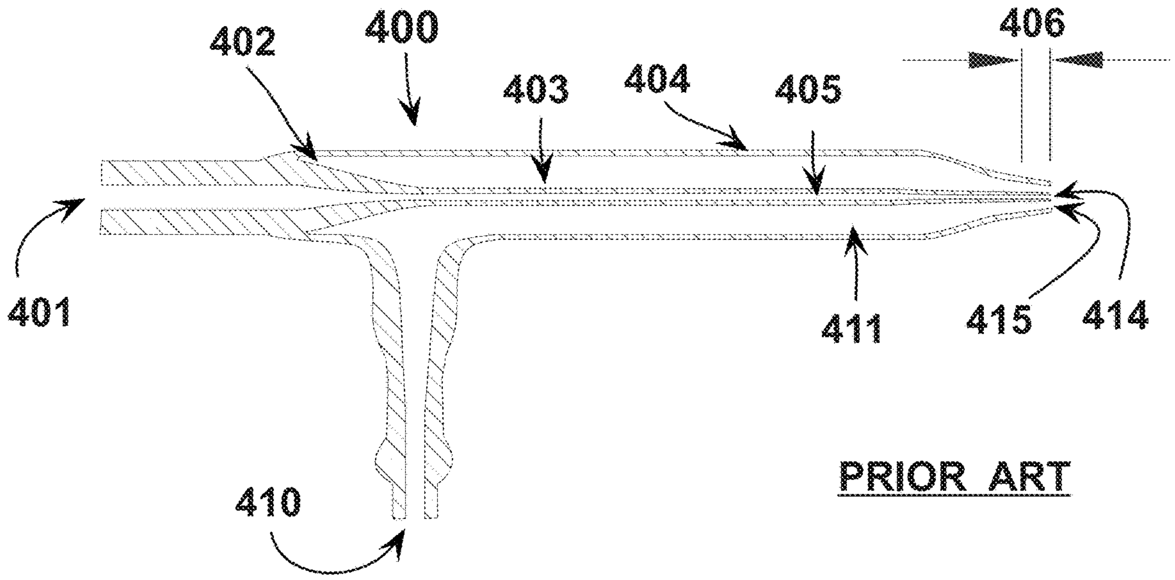
FIG. 4 is a side view cross section of a prior art concentric glass nebulizer for analytical usage.
Figure 5:
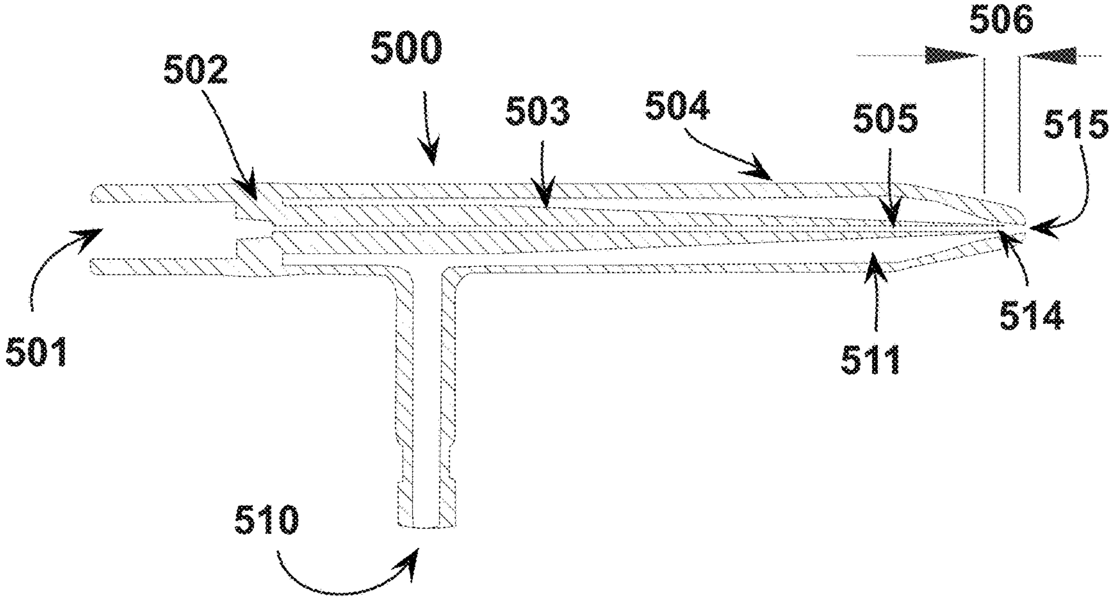
FIG. 5 is a side view cross section of a prior art concentric glass nebulizer for analytical usage.

FIG. 4 and FIG. 5 show side view cross sections of glass concentric nebulizers 400 and 500, which are presently commercially available for analytical usage. For both embodiments, there are first fluid inlets 40 land 501; connecting points 402 and 502 of the inner capillaries 403 and 503 to the nebulizer bodies 404 and 504; a passage 411 and

511 in the body of the nebulizers that conveys the gas flow; an inner capillary 403 and 503 with lumens 405 and 505 that carries the liquid to the exit ports 414 and 514 at the nozzle end 406 and 506. The second fluid inlets (generally gas) 410 and 510 are typically designed as barb fittings or as threaded fittings compatible with commercially available connectors for the gas input lines. These ports allow the gas to flow from the second fluid inlet 410 and 510 through the passages 411 and 511 to the second fluid exit ports 415 and 515 at the nozzle end 406 and 506 of the nebulizers 400 and 500.

FIG. 4 shows a glass nebulizer 400 in which an inner capillary 403 is thick at the connecting point 402, and very narrow from there to the nozzle end 406. The inner capillary 403 extends to the outermost edge of the nozzle end 406 The inner capillary 403 is a thin glass tube and it is very fragile and easy to break or damage. It is also difficult for the central glass tube to remain positioned precisely in the center of the nozzle end 406. It may instead lean to one side.

FIG. 5 shows a glass nebulizer 500 with an inner capillary 503 ground to a conical shape as it travels from the first fluid inlet 501 towards the nozzle end 506. This provides a stronger support for the inner capillary 503, so that the inner capillary 503 is generally more centered than occurs in FIG. 4's embodiment. This nebulizer 500 has an inner capillary 503 recessed from the outermost edge of the nozzle end 506, but still has the first fluid exit port 514 within the second fluid exit port 515. The OD of the inner capillary 503 is smaller than the ID of the second fluid exit port 515.

Concentric nebulizers 400 and 500 are typically made of rigid materials such as glass, quartz or metals. This is necessary to enable the long, thin inner capillary 403 and 503 to remain centered in the second fluid exit port 415 and 515. Forming a glass capillary of the correct dimensions requires a highly skilled glass blower, or in the case of FIG. 5, a diamond tool CNC lathe to grind the inner capillary into the correct shape.

Figure 6:
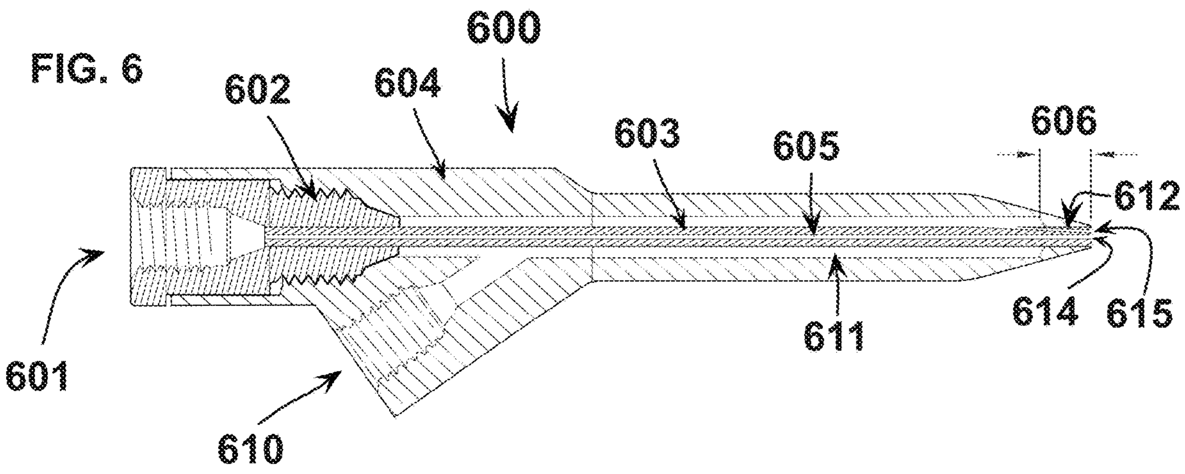
FIG. 6 is a side view cross section of a nebulizer in accordance with an embodiment.

FIG. 6 is a side view cross section of the new art of this design, showing an embodiment of a pneumatic nebulizer 600 as presented in this patent. Similar to a concentric nebulizer, there is a first fluid inlet section 601; a fitting 602 connecting the inner capillary 603 to the nebulizer body 604. The connecting fitting 602 may be a compression fitting as shown, or other means of attachment, such as, being glued or welded. The first fluid is typically a liquid but, in some embodiments, may be a gas.

The nebulizer body 604 has a passage 611 extending from the fitting 602 to the nozzle end 606. The passage 611 has a smaller diameter within the nozzle end 606 than it does throughout the majority of the nebulizer body 604. The inner capillary 603 has a single lumen 605 that carries the first fluid to the first fluid exit port 614 in the nozzle end 606. The inner capillary 603 has an outer diameter that equals the internal diameter of the passage 611 within the nozzle end 606. This seals passage 611 in the nozzle end 606 so that the second fluid traveling from the second fluid inlet 610 through the passage 611 to the nozzle end 606 is blocked. At least one opening 612, in the form of a hole, notch or small passage is presented in the wall of the inner capillary 603 extending from the wider section of the passage 611 to the second fluid exit port 615. This allows the passage of the second fluid through the nozzle end and out the second fluid exit port 615.

The second fluid inlet 610 can be designed to receive a fitting to attach a fluid input line, or may be glued or welded.

The nebulizer 600 more closely resembles a concentric arrangement than a parallel path arrangement for the majority of the nebulizer body 604, however, the inner capillary 603 is much larger than what is possible in a concentric nebulizer. For instance, instead of a few hundred microns in diameter typical for a glass concentric nebulizer's inner capillary at the nozzle end, nebulizer 600 allows for similar operating gas and liquid flows with an inner capillary outer diameter of 1600 microns. Thus, the nebulizer 600 can use standard off-the-shelf tubing for inner capillaries. This eliminates the requirement for glassblowing, CNC machining, and/or custom ordered multi-lumen tubing for the inner capillary.

Figure 7A:
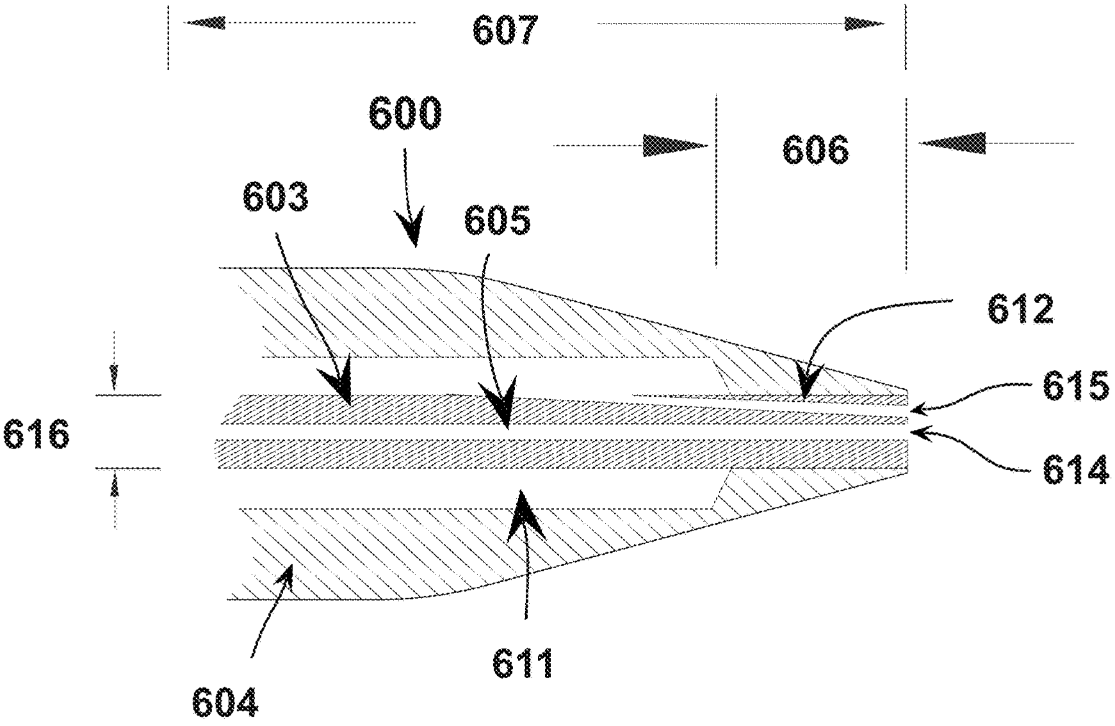
FIG. 7A is a side view cross section showing the nozzle end in greater detail.
Figure 7B:
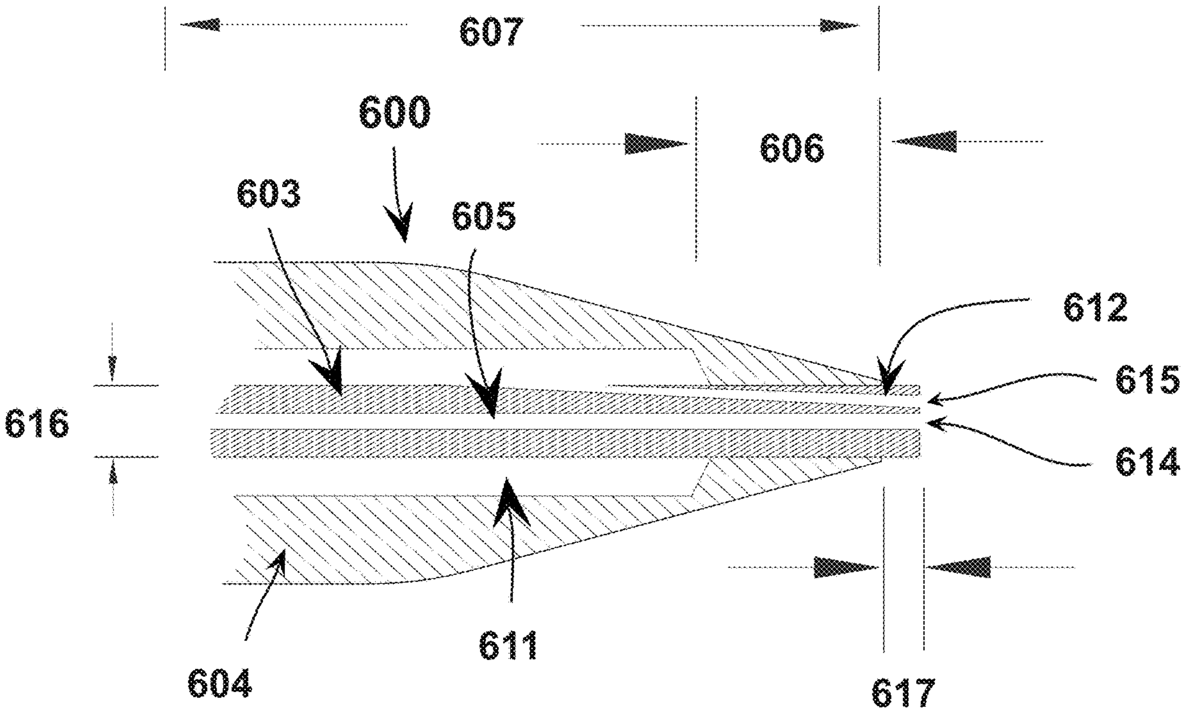
FIG. 7B is a side view cross section similar to FIG. 7A, but with of the end of the inner capillary protruding past the nozzle end.
Figure 7C:
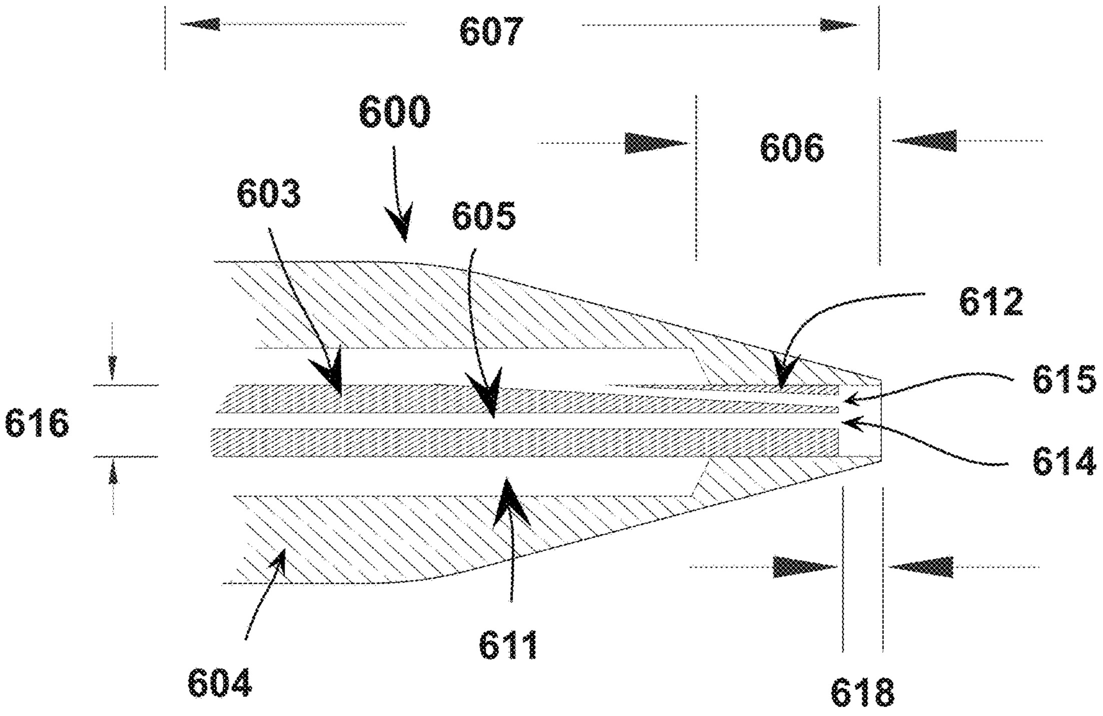
FIG. 7C is a side view cross section similar to FIG. 7A, but with of the end of the inner capillary recessed in the nozzle end.

FIG. 7A, FIG. 7B and FIG. 7C show a close up side view cross section of the tip of the nebulizer 600 shown in FIG. 6. The inner capillary 603 has a single lumen 605 that conveys the liquid from the first fluid inlet 601 to the first fluid exit port 614 in the nozzle end 606. The passage 611 narrows in the nozzle end so that the ID of the passage 611 is in contact with the OD of the inner capillary 603. Within the nozzle end 606, the passage 611 is sealed to the inner capillary 603. The length of the nozzle end 606 is dependent on the inner capillary's OD 616. Typically, the length of the nozzle end 606 should be similar in size to the outside diameter of the inner capillary 616 or 3 to 5 times longer. For instance, if an inner capillary is 1500 microns OD, the nozzle end will generally work best if it is on the order of 4500 to 7500 microns in length. As the nozzle end 606 becomes longer, it becomes more difficult to insert the inner capillary 603 due to increased surface friction, so that it properly seals the passage 611. With the ideal nozzle end length at 3 to 5 times the outside diameter 616 of the inner capillary, it is apparent that a nozzle end length of more than ten times 607 is undesirable and may be considered as an upper limit. 607 on the figures is ten times the OD of the inner capillary 616.

The gas is delivered through the passage 611 in the nebulizer body 604. The passage 611 surrounds the inner capillary 603 through the majority of the nebulizer body 604. However, at the nozzle end 606, which is plugged with the inner capillary 603, there is an opening 612 in the form of a hole, notch or small passage in the wall of the inner capillary 603 that allows the gas to travel from the passage 611 to the second fluid exit port 615.

FIG. 7B is the same as FIG. 7A, except that the inner capillary is extending from the outermost edge of the nozzle end 606, with a small portion 617 protruding past the nozzle end 606. This may be beneficial for some configurations of the gas and liquid exit ports to enhance the formation of an aerosol.

FIG. 7C is the same as FIG. 7A, except that the inner capillary is recessed from the outermost edge of the nozzle end 606, leaving a small space 618 in the nozzle end 606. This may enhance the suction on the first fluid exit port as the gas exits from the second fluid exit port.

In conventional enhanced parallel path analytical nebulizers (such as shown in FIG. 1), the multi-lumen capillary 103 is drawn from the first fluid inlet 101 through the entire length of the nebulizer body 104. Typically, the multi-lumen capillary may be about 0.0625" (1.58 mm) OD and the length of the nebulizer body's inner hole is 2.25 inches (57 mm). This is a ratio of 36:1. Such a length relative to diameter puts high stresses onto any material being pressed, pushed or pulled into the hole.

In comparison, an embodiment of the design presented in this patent may have a nozzle end of length 0.12 inches (3 mm), and the inner capillary may measure about 0.0625 inches (1.58 mm). This is a ratio of less than 2:1. As such, the surface tension on the inner capillary while being pressed, pushed or pulled into the nozzle end is subject to roughly 1/18 of the forces used for the conventional enhanced parallel path nebulizers. The minimal force required means that most materials can now be used in this application. Soft materials can be pressed, pushed or pulled into a short nozzle end without being stretched, and hard materials can also be pressed, pushed or pulled into a short nozzle end since very little surface area makes contact. Thereby there is minimal surface friction between the inner and outer components. These sizes are examples only. The nebulizer in this design can scale up to much larger sizes and/or down to much smaller sizes with the same benefits.

Figure 8:
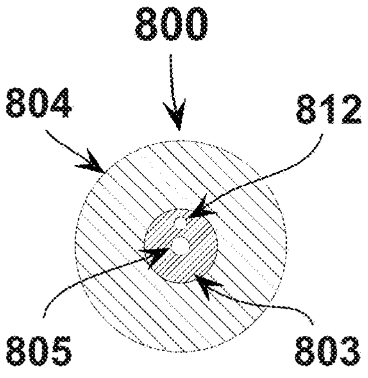
FIG. 8 illustrates a first embodiment from a front view, viewed close to the tip.

FIG. 8 shows a front view of one possible arrangement 800 of an opening 812 in the wall of the inner capillary 803. The inner capillary 803 which has a single lumen 805, seals the nozzle end 606 except for the at least one opening 812, which allows the second fluid, generally a gas, to pass through the nozzle end 606, and exit through the opening 812, which thereby becomes the second fluid exit port 615.

Figure 9:
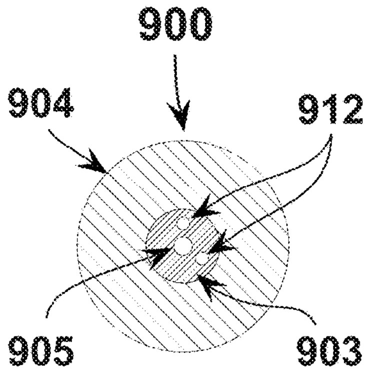
FIG. 9 illustrates a second embodiment from a front view, viewed close to the tip.

FIG. 9 shows a front view of another possible arrangement 900 of openings 912 in the wall of the inner capillary 903. The inner capillary 903 which has a single lumen 905, seals the nozzle end 606 except for the openings 912. There are two openings 912 in the wall of the inner capillary 903 instead of only one as seen in FIG. 8. The openings 912 allow the second fluid, generally a gas, to pass through the nozzle end 606 and exit through the openings 912, which thereby become the second fluid exit port(s) 615.

Figure 10:
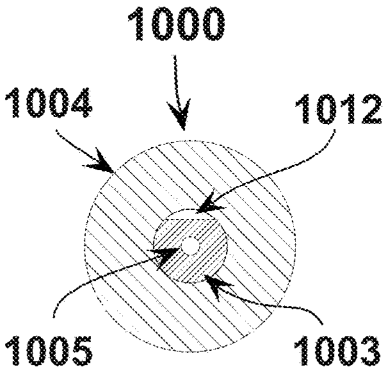
FIG. 10 illustrates a third embodiment from a front view, viewed close to the tip.

FIG. 10 shows a front view of a third possible arrangement 1000 of the opening 1012 in the wall of the inner capillary 1003. The inner capillary 1003 which has a single lumen 1005, seals the nozzle end 606 except for the at least one opening 1012 which allows the second fluid, generally a gas, to pass through the nozzle end 606, and exit through the opening(s) 1012, which thereby become the second fluid exit port(s) 615. In this embodiment 1000, the opening 1012 is a notch rather than a round hole. The shape of the opening(s) 1012 is not a defining aspect of the nebulizer and notches or holes or other shapes may be more appropriate in some cases. The shapes, sizes, and numbers of opening(s) 1012 are determined by the desired gas and liquid flow rates, and by the final interaction method used in the nebulizer's liquid and gas interface.

Figure 11:
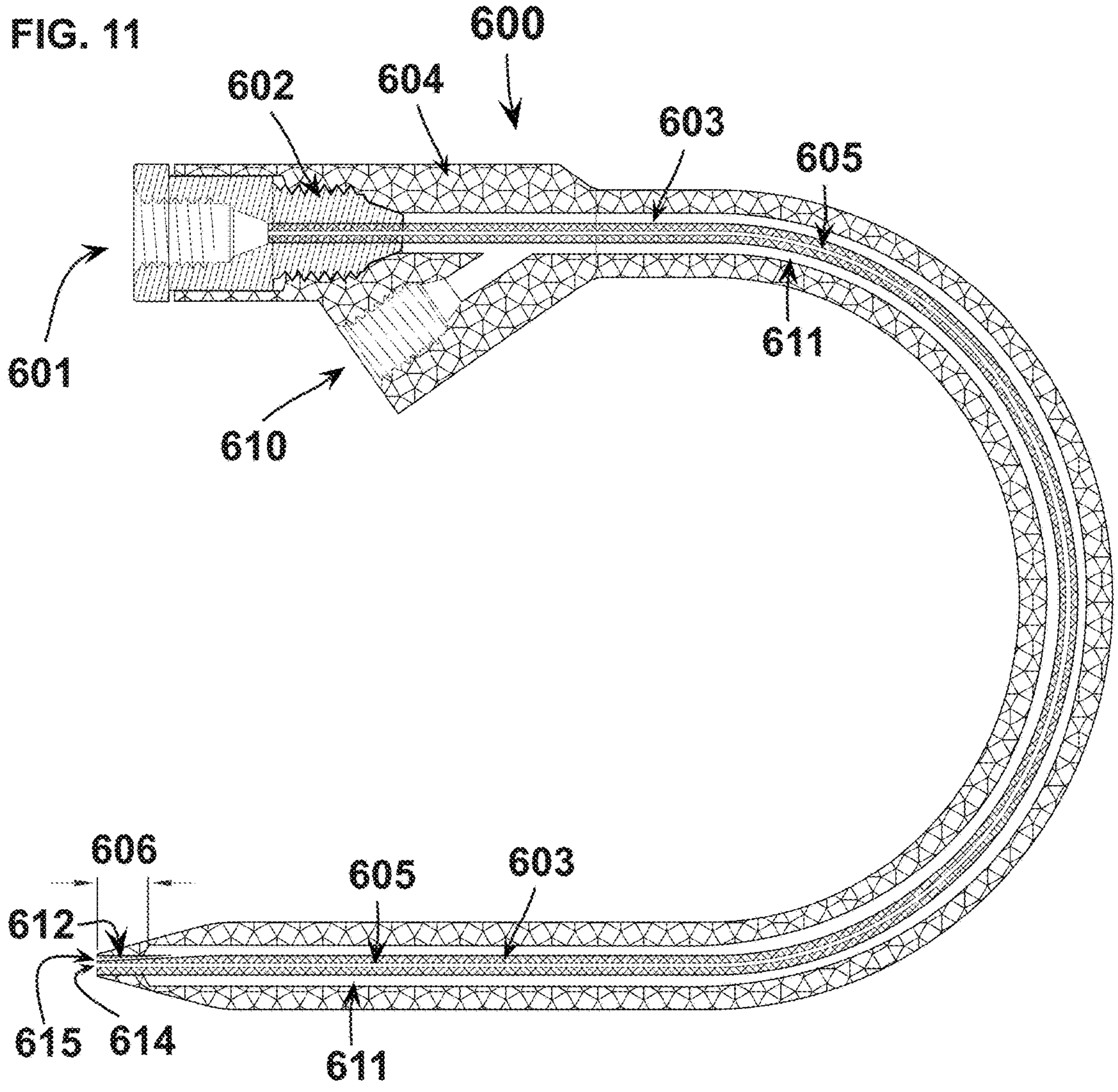
FIG. 11 is a side view cross section of a nebulizer in accordance with an embodiment with a longer, flexible body.

FIG. 11 is a side view cross section of a nebulizer in accordance with an embodiment with a longer, flexible body. The nozzle end is a small part of the nebulizer body and the length of the nebulizer body does not affect the interaction of the gas and liquid at the exit ports in the nozzle end.

Various gas/liquid interaction setups may be easily configured at the first and second fluid exit ports. The interface between the first and second fluid exit ports impacts the efficiency, droplet size distribution, and final liquid flow rates for each configuration. While enhanced parallel path nebulizers may have efficient energy transfer between a gas flow and a liquid, there are many applications that require suction which the enhanced parallel path method does not create. Increasing the second fluid exit port diameter can provide enough gas flow to produce suction on the liquid. Various nebulizers in accordance with these embodiments utilize the enhanced parallel path method or other methods. As such, the nebulizers in this design are referred to as semi concentric enhanced parallel path nebulizers as they are mainly concentric in nature throughout the majority of the nebulizer body, but in the preferred embodiment, the interface between the first and second fluid exit ports will generally be that of an enhanced parallel path design.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A nebulizer comprising:

a nebulizer body having a nozzle end, the nebulizer body defining a first inlet for a first fluid and a second inlet for a second fluid, the nebulizer body having a passage configured to conduct the second fluid from the second inlet through the nebulizer body to a second fluid exit port, an inner capillary defining a cylindrical wall having an outer surface, an inner surface and a single lumen extending the entire length of the inner capillary, the inner capillary configured to conduct the first fluid from the first inlet through the single lumen to a first fluid exit port, with the inner capillary passing through the passage of the nebulizer body;

wherein the passage and the inner capillary come together at the nozzle end and where the first fluid exit port and the second fluid exit port are located at the nozzle end;

wherein the nozzle end has a length less than ten times an outer diameter of the inner capillary;

wherein the nozzle end has an inner diameter that is smaller than an inner diameter of the passage, and the second fluid in the passage is blocked from passing directly through the nozzle end by the inner capillary;

wherein the inner capillary has at least one opening extending from the passage to the second fluid exit port in the nozzle end so that the second fluid in the passage can pass through the nozzle end to exit the nebulizer at the second fluid exit port; wherein the at least one opening penetrate through the outer surface of the cylindrical wall and not the inner surface of the cylindrical wall;

wherein the inner capillary extends into the nozzle end with the first fluid exit port near to the second fluid exit port;

wherein an interaction between the first fluid and the second fluid at the first fluid exit port and the second fluid exit port, with one of the first fluid and the second fluid being a liquid and the other being a gas, atomizes the liquid.

2. The nebulizer as in claim 1, wherein the inner capillary seals the nozzle end of the nebulizer body through a compression fit of the inner capillary into the nozzle end.

3. The nebulizer as in claim 1, wherein the inner capillary seals the nebulizer body by being glued or welded into the nozzle end.

4. The nebulizer as in claim 1, wherein the first fluid exit port and the second fluid exit port are configured to provide an enhanced parallel path method of atomizing the liquid.

5. The nebulizer as in claim 1, wherein the inner capillary is recessed in the nozzle end to provide suction from gas flow on the liquid.

6. The nebulizer as in claim 1, wherein the inner capillary extends to an outermost edge of the nozzle end.

7. The nebulizer as in claim 1, wherein the inner capillary extends past the nozzle end.

8. The nebulizer as in claim 1, wherein the nebulizer is configured to pass the liquid through the inner capillary and the gas through the passage.

9. The nebulizer as in claim 1, wherein the nebulizer is configured to pass the gas through the inner capillary and the liquid through the passage.

10. The nebulizer as in claim 1, wherein the inner capillary comprises plastic, the plastic being one of: Polytetrafluoroethylene (PTFE), Perfluoroalkoxy (PFA), Polyether ether ketone (PEEK), Polypropylene, and polyethylene.

11. The nebulizer as in claim 1, wherein the inner capillary comprises one of: metal, glass, quartz, crystal, and ceramic.

12. The nebulizer as in claim 1, wherein the passage does not intersect the single lumen.

13. The nebulizer as in claim 1, wherein the at least one opening extending from the passage to the second fluid exit port extends at an angle to the single lumen.

* * * * *